United States Patent [19]
Asplund

[11] 3,870,201
[45] Mar. 11, 1975

[54] DEVICE FOR DISPENSING OF A PASTE PRODUCT

[75] Inventor: Alf Åke Asplund, Kristinehamn, Sweden

[73] Assignee: Industrikompaniet, Kristinehamn, Sweden

[22] Filed: Jan. 29, 1973

[21] Appl. No.: 328,474

[30] Foreign Application Priority Data
Aug. 12, 1971 Sweden.............................. 10270/71

[52] U.S. Cl................... 222/207, 222/214, 222/490
[51] Int. Cl............................................. B65d 37/00
[58] Field of Search ........... 222/214, 490, 517, 511, 222/212, 207, 206, 213, 215, 21, 95, 103, 425, 444, 450, 494, 449, 465, 105, 185, 183; 137/511

[56] References Cited
UNITED STATES PATENTS

| | | | |
|---|---|---|---|
| 2,889,966 | 6/1959 | Burt .................................... | 222/449 |
| 3,066,832 | 12/1962 | Rossetti .............................. | 222/207 |
| 3,307,752 | 3/1967 | Anderson............................ | 222/465 |
| 3,405,843 | 10/1968 | Watson, Jr........................ | 222/105 X |
| 3,539,081 | 11/1970 | Norton et al. ...................... | 222/185 |
| 3,726,442 | 4/1973 | Davidson et al..................... | 222/207 |
| 3,741,439 | 6/1973 | Vehrs................................... | 222/103 |

FOREIGN PATENTS OR APPLICATIONS
850,623 10/1960 Great Britain....................... 222/103

Primary Examiner—Robert B. Reeves
Assistant Examiner—Charles A. Marmor
Attorney, Agent, or Firm—Cushman, Darby & Cushman

[57] ABSTRACT

The present invention relates to an apparatus for dispensing of a paste product. It comprises a container with an elastic outlet tube and a casing surrounding the container and provided with a push means for acting on the outlet tube for pressing out the product from the container. A contact piece is disposed in the push means which is removably mounted in the casing. The contact piece is made of elastic material and is provided with a projection disposed to close off the outlet tube against the container and with at least one tongue disposed to hold and return the push means to an inactive position where the outlet tube can be refilled. The apparatus can be disassembled and assembled without aids.

3 Claims, 2 Drawing Figures

DEVICE FOR DISPENSING OF A PASTE PRODUCT

The present invention relates to an apparatus for the dispensing of a paste product, which apparatus comprises a container with an elastic outlet tube, a casing surrounding the container with a push means acting on the outlet tube of the container to press out the product from the container.

Apparatuses for dispensing paste products are known in a number of different designs, with a plunger, a slide or a valve for the dispensing of the product, or with an elastic outlet tube with a push means in the form of a roller or a cam which squeezes the outlet tube to dispense the product. These known designs have given rise to a number of problems, however.

In designs with plungers, slides or valves disruptions of function occur in the dispensing of such products as, for example, soap products which harden in contact with air.

In designs with elastic outlet tubes, which when pressing out the product are acted upon by a push means in the form of a roller or a cam, the life of the outlet tube is short because of the great stresses which the tube is subjected to.

Furthermore the known designs are difficult to take apart for cleaning, or because of their shape are difficult to clean without special equipment. This involves especially great disadvantages in those cases where the apparatuses are used for dispensing of hygienic products such as soap and disinfectants and can result in the apparatuses themselves becoming carriers of such bacteria which the products they contain are intended to counteract.

The present invention has as its purpose the disclosure of a new and significantly simplified construction for an apparatus of the type given in the introduction, which construction removes the above mentioned deficiencies in the known devices.

An apparatus according to the invention comprises a container provided with an elastic outlet tube with an outlet opening where dispensing is achieved by a push means being removably mounted in the casing surrounding the container, said push means supporting an elastic element for the purpose, on the one hand, of pressing together the outlet tube of the container when the push means is pushed, achieving the dispensing of the product from the container, and, on the other hand, for the purpose of returning and holding the push means to the position where the outlet tube can be filled, as well as making possible, due to its elasticity, the dismantling of the parts of the apparatus for cleaning and reassembly without the use of aids. The essential features of the invention are that a contact piece is disposed in the push means, which push means is removably mounted in the casing surrounding the container and which contact piece is made of elastic material and is provided with a projection disposed to close off the outlet tube against the container and with one or more tongues disposed to hold and return the push means to the position where filling of the outlet tube can occur, and that the contact piece is disposed so that the parts comprising the apparatus will be able to be taken apart and put together without aids.

The enclosed drawing shows an example of an embodiment of the apparatus according to the invention.

Figure 1:
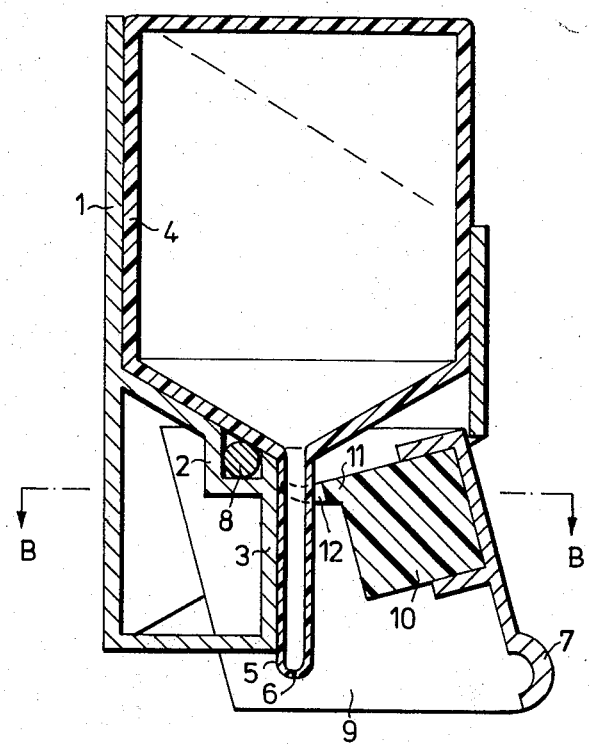
FIG. 1 shows a cross section through an embodiment of an apparatus according to the invention, which cross section lies along the line A—A in FIG. 2.
Figure 2:
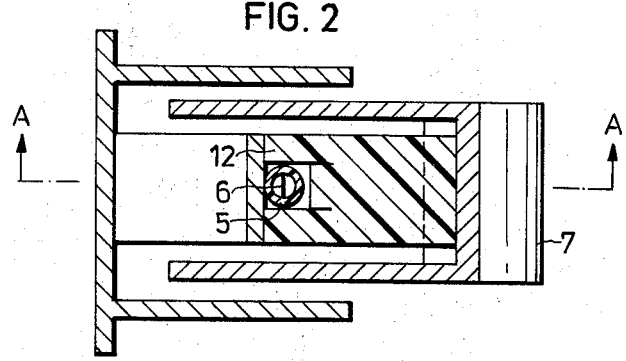
FIG. 2 shows a cross section along the line B—B in FIG. 1.

The embodiment for an apparatus according to the invention, which embodiment is shown in the drawing, consists of a casing 1 designed to be attached to a vertical wall. The casing is constructed with a hook 2 and an opposing plate 3. The casing surrounds a container 4 which is intended for the product which is to be dispensed and is provided with an elastic outlet tube 5 with an outlet opening 6. The outlet tube 5 rests against the opposing plate 3 of the casing 1.

A push means 7 is disposed in the casing with a shaft 8 disposed between the walls 9 of the push means. The shaft 8 is rotatably mounted in the hook 2 of the casing. An elastic contact piece 10 is disposed in the push means 7, said contact piece 10 being provided with a projection 11 and one or more tongues 12, which rest with their free ends against the opposing plate 3 of the casing.

By exerting pressure on the push means 7 it is caused to swing around its shaft 8, whereby the projection 11 of the contact piece 10, by pressure on the outlet tube 5 first closes off the same against the casing, while enclosing a portion of the contents of the outlet tube, whereafter the contact piece finally presses out the enclosed contents through the outlet opening 6. When the push means 7 is no longer pressed, the tongues 12 of the contact piece 10 return the push means to its starting position so that the outlet tube 5 can be refilled.

According to the invention, the elastic outlet tube 5 is acted on by a contact piece 10 which is also elastic and is provided with a projection 11 for closing off the outlet tube 5 against the container 4. A soft contact is obtained thereby between these two parts, giving the outlet tube a long life.

To dismount the apparatus, the container 4 is lifted out of the casing 1. The push means 7 is then acted on so that the tongues 12 of the contact piece 10 are bent so much that the shaft 8 of the push means can be removed from the hook 2 of the casing, whereupon the push means can be taken out of the casing, and the elastic contact piece can be removed from its position in the push means. The mounting of the apparatus is done in the reverse order. The elastic contact piece according to the invention with its tongues, due to their elasticity, makes possible the disassembly as well as the cleaning and assembly of the apparatus without aids.

What I claim is:

1. Apparatus for dispensing of a paste product, said apparatus comprising
   a. a container having an elastic outlet tube, said elastic outlet tube normally receiving paste from said container and adapted to be pressed to have paste expelled therefrom through an opening therein,
   b. a casing for receiving said container, said casing having an abuting member abuting said container outlet tube,
   c. means for pressing said elastic outlet tube against said casing abuting member for expelling paste therefrom without damage thereto, said means comprising a push means removably pivotally mounted in said casing and having a contact piece of elastic material disposed therein, said contact piece having a first integral projection of elastic material for engaging said outlet tube and closing off said outlet tube against said abuting member, whereby said projection engages and closes off said outlet tube and then said contact piece of said push means presses said outlet tube to expel paste therefrom, and d. means for biasing said push means to a position wherein said outlet tube is not pressed but is free to receive paste from said container, said means comprising a pair of second projections of elastic material extending from and integral with said contact piece and straddling said first projection and said outlet tubing, each of said projections having a free end thereof engaging said abuting member of said casing.

2. Apparatus as recited in claim 1 wherein said casing includes a hook-shaped portion for receiving a means of said push means for removably pivotally mounting said push means.

3. Apparatus as recited in claim 2 wherein said means of said push means for pivotally mounting said push means comprises a shaft attached to a pair of wall portions of said push means, said wall portions straddling said second projections of said contact piece.

* * * * *